UNITED STATES PATENT OFFICE.

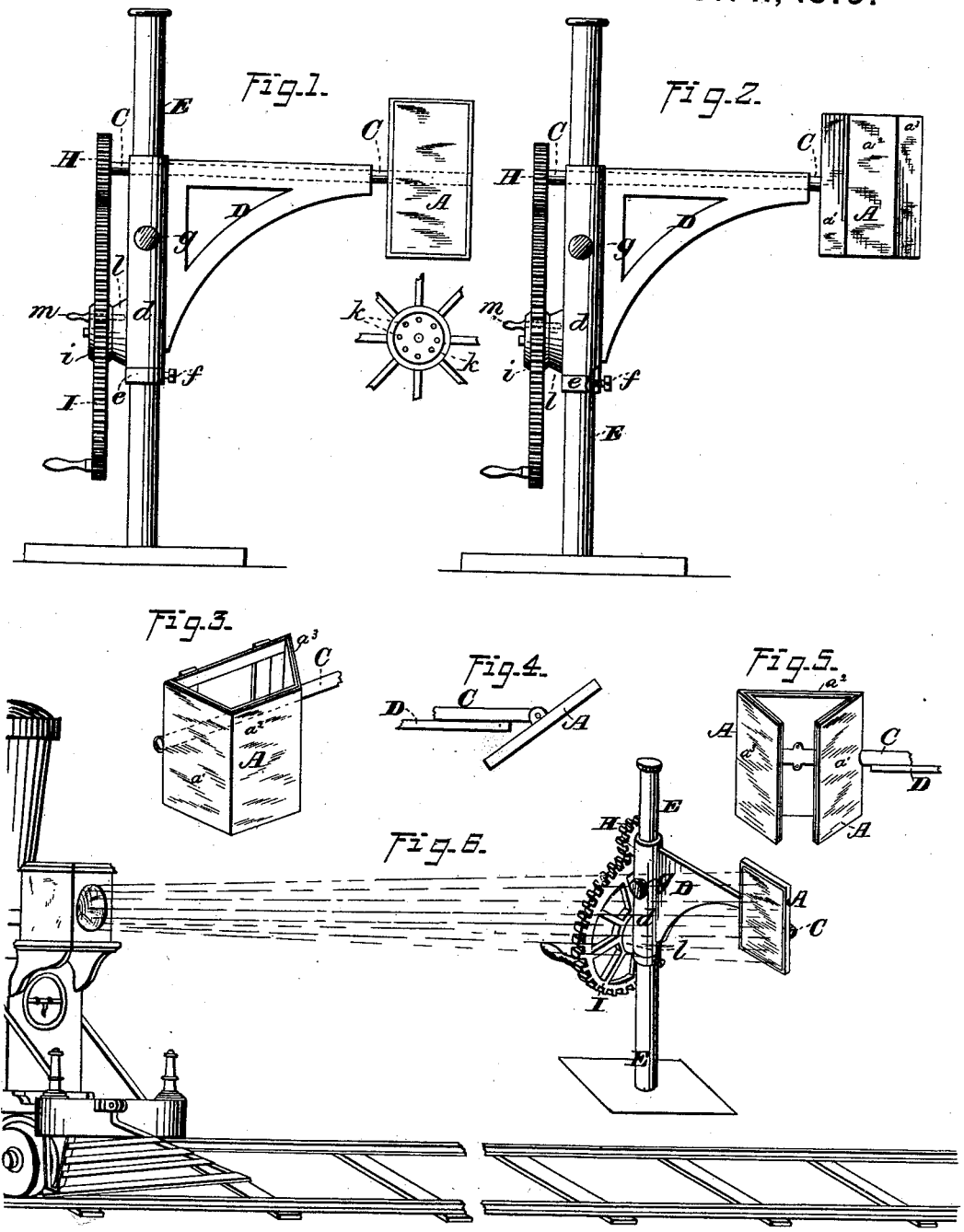

HENRY W. SPANG, OF READING, PENNSYLVANIA.

IMPROVEMENT IN RAILWAY-SIGNALING.

Specification forming part of Letters Patent No. 221,625, dated November 11, 1879; application filed March 22, 1879.

*To all whom it may concern:*

Be it known that I, HENRY W. SPANG, of Reading, in the county of Berks and State of Pennsylvania, have invented certain new and useful Improvements in Railway Night-Signaling, of which the following is a specification.

The object of this invention is to obviate the necessity of using lamps for night-signaling at stations or near visual signals, or upon switch-levers, draw-bridges, &c., along railways.

Railway signal-lamps, as is well known, are very expensive, and require constant attention in order that they may be kept in efficient condition. They are, besides, not reliable, owing to their liability to be blown out by wind when exposed.

In endeavoring to replace the system of lamp-signaling at stations and along railways by one less expensive, more reliable, and requiring less attention, my invention consists in arranging at a signal-station, or upon or near any object along a railway, a mirror or reflecting-surface, which may be adjusted to receive and reflect the rays from the head-light of an approaching locomotive when danger is to be indicated, and reversed or adjusted so as not to interrupt or reflect the light when all is safe.

The invention also consists in a novel signaling apparatus, by which my improved system is carried into effect.

On approaching a signal-station or any other portion of the road, if the engineer or look-out observes that the rays of his locomotive head-light are reflected back, or a bright or illuminated spot or space appears ahead, he will know that there is danger, and slack his speed or stop his locomotive.

Of course, the reflection of the light may, if desired, indicate safety, and its absence danger, and the mirror or reflecting-surface may have a plurality of sides or faces, or be of an oval or globular form, so that the rays of light it receives will be reflected not only back toward the approaching locomotive, but at greater or less angles, as desired, on opposite sides of the road to warn persons or trains approaching on cross-roads; or the mirror may be set to reflect the whole light received from the head-light at right angles to the railway to give warning of the approach of a train.

In the accompanying drawings, Figure 1 illustrates the arrangement of a mirror for signaling to the engineer of an approaching train. Fig. 2 illustrates a form of mirror for reflecting the rays of the head-light back to the locomotive and almost at right angles to the railway. Fig. 3 is a perspective view of this arrangement of mirrors. Fig. 4 shows a mirror arranged to reflect only at a right angle to the direction of the train's approach. Fig. 5 is a modification of the mirror. Fig. 6 is a view of my invention as when in actual use.

The letter A indicates a flat mirror mounted upon the outer end of a rotary shaft, C, which has its bearings in an adjustable bracket, D, attached to a signal post or standard, E, located alongside a railway-track.

The lower end of the sleeve $d$ of the bracket D rests upon a collar, $c$, which may be moved up or down upon the standard E, and secured in position by clamp-screw $f$.

The bracket may be swung around to any desired position, and is also secured in position by a clamp-screw, $g$.

On the inner end of the shaft C is fixed a gear-wheel, H, which meshes with another gear-wheel, I, journaled on the sleeve $d$, and provided with a crank-handle, by which it may be turned.

The hub $i$ of the wheel I is provided with an annular series of holes, $k$, and plays near the face of a projection, $l$, on the sleeve $d$. This projection has a recess or socket (indicated by dotted lines) of proper size to receive a pin, $m$, which can also pass through either of the holes $k$, so that when the shaft has been turned to the desired position the wheel I may be locked to hold it in this position by inserting the pin $m$ through one of the holes $k$ and into the recess or socket in the projection $l$.

The apparatus which I have now described is a convenient form which I have contemplated for practical use; but of course in carrying out my system I do not confine myself to any particular mechanism.

In Figs. 2 and 3 the mirror has three reflecting-faces, $a'$ $a^2$ $a^3$, the central face being to reflect the light for the observation of the engineer of an approaching train, and the other faces reflect the rays both ways, at right angles to the track, to warn persons or trains on cross-roads that a train is approaching. This form of mirror is especially adapted for use when the reflected light is understood to indicate safety; but by having the central face, as in Fig. 5, between the diverging edges, instead of the converging edges of the two faces, it is obvious that the side faces may receive and reflect the light of the head-light, while the center face will be turned from it, and may indicate safety by its failure to reflect.

In Fig. 4 the mirror is arranged at an angle on its shaft to reflect all the light received from the head-light laterally when all is safe, and will warn persons on roads intersecting the railway that a train is approaching.

In operating the signal-mirror as now described, the signal-man simply swings the bracket to such a position over the track that it will catch the rays of the head-light of an approaching engine, and secures it by the clamp-screw; then, by turning the wheel I, the mirror may be brought to a proper position and thus locked by means of pin $m$.

A mirror or any suitable reflecting-surface can be applied to a railway-switch or drawbridge, so as to indicate the position of the switch or draw-bridge, and it can also be employed to indicate any point along a railway. It can be applied to the rear end of a locomotive or train to caution a following locomotive or train, and also be employed as one of the sides of a railroad hand-lamp, to be used to signal an approaching train when the lamp is blown out by the wind or its light is dim.

Instead of employing a movable mirror for signaling purposes, a stationary one can be used, which must be concealed by red or white bunting or any opaque material, or by gilt paper or other suitable reflecting material, and the removal of the bunting or gilt paper from view by a signal-man, switch, draw-bridge, electro-magnet, or any other device, so as to expose the stationary mirror to the rays from the head-light of an approaching train, can indicate safety, as desired.

The mirror, whether movable or stationary, should be protected, so as to prevent it from being broken by hail, sleet, &c.

I am aware that a mirror has heretofore been fixed upon a locomotive or a car in a train to enable the engineer or other train-attendant to observe, by reflection, other portions of the train and signals made thereon. I am also aware that mirrors have been arranged upon the cars of a train and adapted to be so adjusted as to catch the light from a lamp on the locomotive or another car and reflect it back as a signal. I do not claim these arrangements or modes of using mirrors for signaling. Such devices are simply for conveying information from one portion of a train to another, to give notification of what has already taken place or is taking place, and are not warnings of danger or safety ahead of a train.

In my system information is conveyed from a station to a train, and also from the train to a station and to all points within sight of the mirror at the station; and the signal is never brought into effect until the precise time it is required, so that there is no liability of erroneous or useless signaling or of failure to signal from a station on account of extinguishment of lamps by the wind or accident, or as the result of negligent trimming or filling.

Having now described my invention and explained the manner of carrying it into effect, I claim—

1. The system of railway-signaling, substantially as herein described, the same consisting in arranging a mirror or reflecting-surface in proper proximity and relation to a railway-track, so that said mirror or reflecting-surface will receive and reflect the light from the head-lamp of an approaching locomotive in any desired direction, as set forth.

2. A standard or post carrying a mirror adapted for adjustment into and removal from the line of the beam of light from the head-light of a locomotive on a railway-track, whereby the reflecting-surface of the mirror will receive and reflect the light from the head-light of the locomotive, substantially as described.

3. The combination of the post E, adjustable sleeve $d$, carrying the arm D, the shaft C, carrying at one end a mirror and at the other end the wheel H, gearing with the wheel I, mounted on the adjustable sleeve, said parts being arranged in such proximity and relation to a railway-track that the mirror will receive and reflect the light from the head-light of an approaching locomotive in any direction, substantially as described.

In testimony that I claim the foregoing I have hereunto set my hand in the presence of the subscribing witnesses.

HENRY W. SPANG.

Witnesses:
  C. HOLTON,
  E. R. ADAMS.